US009936648B2

(12) United States Patent
Jahn

(10) Patent No.: US 9,936,648 B2
(45) Date of Patent: Apr. 10, 2018

(54) PACKING ELEMENT PARTICULARLY FOR CUT FLOWERS AND POTTED PLANTS

(71) Applicant: Weber Verpackungen GmbH & Co. KG, Wickede/Ruhr (DE)

(72) Inventor: Klaus Jahn, Bielefeld (DE)

(73) Assignee: WEBER VERPACKUNGEN GMBH @ CO. KG, Wickede/Ruhr (DE)

( * ) Notice: Subject to any disclaimer, the term of this patent is extended or adjusted under 35 U.S.C. 154(b) by 10 days.

(21) Appl. No.: 15/168,123

(22) Filed: May 30, 2016

(65) Prior Publication Data

US 2016/0345508 A1 Dec. 1, 2016

(30) Foreign Application Priority Data

May 29, 2015 (DE) .................... 20 2015 003 775 U

(51) Int. Cl.
*B65D 85/50* (2006.01)
*B65D 85/52* (2006.01)
(Continued)

(52) U.S. Cl.
CPC ................. *A01G 5/06* (2013.01); *A01G 5/04* (2013.01); *A01G 13/00* (2013.01); *B65D 59/04* (2013.01);
(Continued)

(58) Field of Classification Search
CPC ...... A01G 5/06; A01G 5/04; A01G 2013/006; A01G 13/00; B65D 75/5827;
(Continued)

(56) References Cited

U.S. PATENT DOCUMENTS 2,047,980 A 7/1936 Olm et al.
4,460,088 A * 7/1984 Rugenstein ........ B65D 75/5838
206/264
(Continued)

FOREIGN PATENT DOCUMENTS

AT 75682 A 11/1992
DE 2501691 A 7/1976
(Continued)

*Primary Examiner* — J. Gregory Pickett
*Assistant Examiner* — Rafael Ortiz
(74) *Attorney, Agent, or Firm* — Andrew Wilford

(57) ABSTRACT

A packing element having a trapezoidal front panel (1) and trapezoidal rear panel (2), wherein the front panel (1) and the rear panel (2) each have a first pair of two opposite, parallel base edges (1a, 1b, 2a, 2b), and a second pair of nonparallel side edges (1c, 2c) bridging ends of the two base edges (1a, 1b, 2a, 2b), and wherein the front panel (2) and the rear panel (1) are connected to each other at their side edges, preferably in the edge region of their overlapping side edges (1c) such that an inner edge face of the front panel (2) facing the rear panel (1) is glued to an inner edge face of the rear panel (1) facing the front panel (2) and a space for receiving an article, preferably a conical article, preferably a flower pot or a flower bouquet, can be formed between the front panel (2) and the rear panel (1) by moving the panels away from each other, thereby forming an opening at least between the long base edges at the top, characterized in that a grab formation (4), particularly a strap (4) that can be gripped by hand, is provided on the front panel (1) above a tear line (3) provided in the front panel (1) between the side edges (1c, 2c), preferably running parallel to the base edges (1a, 1b) of the front panel (1) so that an upper region (1d) of the front panel (1) above the tear line (3) can be separated from a lower region (1e) of the front panel (1) below the tear line (3).

10 Claims, 1 Drawing Sheet

(51) Int. Cl.
*A01G 5/06* (2006.01)
*B65D 65/04* (2006.01)
*B65D 75/02* (2006.01)
*B65D 75/58* (2006.01)
*B65D 65/42* (2006.01)
*A01G 5/04* (2006.01)
*A01G 13/00* (2006.01)
*B65D 59/04* (2006.01)
*B65D 65/18* (2006.01)

(52) U.S. Cl.
CPC .............. *B65D 65/04* (2013.01); *B65D 65/42* (2013.01); *B65D 75/02* (2013.01); *B65D 75/5827* (2013.01); *B65D 75/5838* (2013.01); *B65D 85/505* (2013.01); *B65D 85/52* (2013.01); *B65D 65/18* (2013.01)

(58) Field of Classification Search
CPC .... B65D 75/5838; B65D 65/04; B65D 59/04; B65D 75/02; B65D 65/42; B65D 85/505; B65D 85/52; B65D 65/18
USPC ....... 206/423; 47/72, 20.1, 65.5, 66.1, 41.01
See application file for complete search history.

(56) References Cited

U.S. PATENT DOCUMENTS

| | | | |
|---|---|---|---|
| 4,657,142 A | 4/1987 | Mizoguchi | |
| 5,111,638 A | 5/1992 | Weder | |
| 5,199,242 A * | 4/1993 | Weder | A47G 7/085 53/397 |
| 5,226,735 A * | 7/1993 | Beliveau | B65D 33/01 383/103 |
| 5,467,573 A | 11/1995 | Weder et al. | |
| 6,023,885 A * | 2/2000 | Weder | A47G 7/085 206/423 |
| 6,129,208 A * | 10/2000 | Ferguson | B65D 85/52 206/423 |
| 6,574,920 B1 * | 6/2003 | Weder | A47G 7/085 206/423 |
| 2004/0003537 A1 | 1/2004 | Gilbert | |
| 2004/0031197 A1 | 2/2004 | Weder | |
| 2005/0269386 A1* | 12/2005 | Fisher | B65D 65/18 229/87.06 |

FOREIGN PATENT DOCUMENTS

| | | |
|---|---|---|
| DE | 2501694 A | 7/1976 |
| DE | 19827987 A | 12/1999 |
| DE | 29827987 A | 12/1999 |
| DE | 19909448 A | 10/2000 |
| DE | 19909448 A1 | 10/2000 |
| DE | 202009018673 U1 | 11/2012 |
| DE | 202014002785 U | 7/2014 |
| DE | 202014002785 U1 | 7/2014 |
| EP | 0680717 A | 2/2004 |
| EP | 1690801 A | 8/2006 |
| EP | 1690801 A1 | 8/2006 |
| GB | 2486105 A | 6/2012 |
| JP | 2013-023275 A | 2/2013 |
| JP | 2013-136413 A | 7/2013 |
| NL | 8201851 A | 12/1983 |
| NL | 1035902 C | 9/2008 |
| WO | 97/128819 A1 | 4/1997 |

* cited by examiner

PACKING ELEMENT PARTICULARLY FOR CUT FLOWERS AND POTTED PLANTS

FIELD OF THE INVENTION

The invention relates to a packing element having a trapezoidal front panel and trapezoidal rear panel each having a first pair of opposite and parallel base edges and a second pair of nonparallel side edges bridging ends of the respective two base edges, the front panel and the rear panel being connected together at their side edges so that a space for receiving an article, preferably a conical article, preferably a flower pot or a flower bouquet, can be formed between the front panel and the rear panel by moving the panels away from each other, thereby forming an opening at least between the long base edges at the top.

BACKGROUND OF THE INVENTION

The connection of the front panel and the rear panel at the side edges can be a fold or a weld. Preferably, the overlapping side edges are connected to each other in that an inner edge face of the front panel that faces the rear panel is glued to an inner edge face of the rear panel that faces the front panel.

Packing elements of the type named above are known in the prior art, for example in DE 20 2014 002 785 of applicant.

This type of packing element is used for example, to transport potted flowers, flower bouquets, or plants, or to present same for sale. Particularly for transport, the packing element is given a sufficient height—that is the spacing between the parallel upper and lower base edges—that a space for a flower or plant projecting beyond a flower pot is surrounded by the packing element, thereby achieving protection during transport. The upper regions of a plant/flower are also frequently compressed by the packing element such that the plant/flower needs a small standing surface during transport.

Following transport, however, the plant/flower should receive adequate light, so that the compression of the upper region should be undone. The packaging must accordingly be removed.

In addition, when the plant is presented for sale, the consumer should have the least restricted view possible of the flower or plant, which is not a problem as long as the packing element of this type is made completely of transparent film. This is typically the case, but is questionable when considering the environment.

For environmental protection, there is a tendency to make packing elements of this type from a paper material or paper composite material. Such materials, however, are not transparent so a consumer cannot see a packaged flower or plant. In this case, the packaging would need to be removed prior to presentation for sale.

OBJECT OF THE INVENTION

The object of the invention is to further improve a packing element of the above-described type such that after being protected for transport by the applied packing element, a plant or a flower bouquet can be unpacked quickly and easily. A further object of the invention is, particularly in the case of a packaging made exclusively of paper, that the plant/flower quickly receives adequate light, and that the configuration enables presentation for sale with a full view of the unfolding flower or plant region above the pot.

SUMMARY OF THE INVENTION

This object is attained in that a grab formation, particularly a strap that can be gripped by hand, is provided on the front panel above a tear line provided in the front panel between the side edges, preferably running parallel to the base edges of the front panel, by means of which an upper region of the front panel above the tear line can be separated from a lower region of the front panel below the tear line.

The core thinking of the invention is that at least the front panel, and according to a preferred embodiment described below, also the rear panel, is/are divided vertically into a lower region and an upper region by a tear line. By attaching a grab formation above the tear line, that is to the upper region of the front panel, the front panel can be separated from the lower region in a very simple, defined manner.

To accomplish this, it is only necessary to grip the grab formation, example a strap, and pull on it, thereby undoing the connection of the lower region to the upper region of the front panel at the tear line. The front panel can then be torn off the packing element. As a result, the transported plant/flower is no longer held together in the upper region thereof by the packing element, and can unfold and receive adequate light.

A tear line can be constructed for example by a linear row of perforations or a thinning of the material, particularly either way by in multiple localized spots along a straight-line path.

In addition, the plant/flower is exposed to view for sales presentation, even though the packing element is not made of film.

The grab formation, particularly the strap, is preferably attached to the front panel immediately at the tear line or at least near same, particularly at a spacing of less than 2 cm, preferably less than 1 cm, and more preferably less than 0.5 cm.

According to the invention, if the side edges are glued, the adhesion of the side edges can preferably be made detachable between the front panel and the rear panel, at least in the upper region above the tear line. Preferably, in this way the upper region of the front panel can be made separable from the rear panel at the adhesion zone in this way, particularly without destroying the upper region of the front panel, which is particularly important if the upper region of the front panel is constructed of another material than the lower and/or the rear panel. Such a bonding can be constructed as glue spots spaced apart from each other.

If there is a connection of the front panel and the rear panel to the side edges at a fold or weld, a corresponding tear line can also be included in the fold or weld region to promote separation of the upper front panel from the rear panel.

The invention makes it possible to produce the packing element, for example, entirely of paper or a paper composite material, and still allow the plant/flower to unfold following transport, and to be exposed to view, because of the detachment of at least the upper region of the front panel.

However, in one preferred embodiment of the invention, the rear panel and the lower region of the front panel lying below the tear line are constructed of a paper or paper composite material, and the upper region of the front panel lying above the tear line is constructed of a preferably transparent film. In this way, a plant can receive adequate light through the transparent front panel, even during transport or thereafter, even if the upper front panel is not immediately removed, and it is possible for most of the packing element to be made of paper and/or paper composite material.

If the upper region of the front panel is made of film, according to the invention the lower region of the front panel can overlap at its upper edge the lower edge of the upper film region of the front panel. This overlap can be designed such that the lower region lies at the front, that is toward the outside of the packing element, so that the lower region also lies at the back, that is facing the inside of the packing element.

In this case, the tear line can also preferably be in the upper film region of the front panel, and be covered by the upper edge of the lower region of the front panel. Such a tear line can be constructed as mentioned above, for example as a row of perforations.

To make the front panel made of two materials, stable overall, the upper film region of the front panel and the lower region of the front panel can then be connected by bonding in the overlap region below the tear line.

In addition, if the upper region of the front panel is made of film, or in general if the front panel is divided above and below, according to the invention the connection region between the lower region of the front panel and the upper region of the front panel can form the tear line, or at least comprise same. As such, the tear line in this case can also be formed by the bonding, particularly specifically by a line of adhesive/glue, that connects the adjoining, and particularly overlapping edges of the upper and lower regions, and that tears apart when force is applied by pulling.

In a preferred embodiment, the rear panel can also have a tear line running between the side edges, preferably parallel to the base edges. In this way, the upper region of the rear panel can also be easily separated. In this case as well, this tear line can be formed by a perforation or a thinning of material, or, if the rear panel is subdivided into upper and lower regions, can be formed by the connection, specifically the line of adhesive, that connects the two regions.

Afterward, preferably only the pot of a plant/flower remains surrounded by the rest of the packing element, or even this remnant is removed, such that overall, the prior removal of the upper region significantly simplifies the unpacking, without it being necessary to grasp the plant in the packing element and pull on it.

According to the invention, the tear line of the rear panel can run parallel to the tear line of the front panel and at a spacing therefrom, particularly at a spacing of less than 10 mm, preferably less than or equal to 5 mm. In this case, the tear line of the rear panel can also preferably be level with the upper edge of the lower region of the front panel, which is favorable as concerns manufacturing.

According to the invention, the tear line of the front panel, in particular also the tear line of the rear panel, are preferably at a spacing from the short base edge of the front panel and/or the rear panel that is less than 50% of the spacing between the long and the short base edges. With respect to the height, therefore, the respective tear lines are positioned below the middle.

In a further embodiment, the height of the trapezoid, particularly the spacing between the parallel base edges, is less in the front panel than in the rear panel, particularly such that the rear panel is not covered by the front panel at its upper base edge. Such a design makes it easier to spread the front panel and rear panel, originally lying against each other, in order to insert a pot into the opened space.

The uncovered region of the rear panel can advantageously be separable from the covered region at a tear line. Such a separation can be performed for example, immediately after the packaging.

Packing elements of the type according to the invention can form, when opened, both pouches that are closed at the bottom, and also a tapered tube with two open ends.

Constructing the front panel and the rear panel of paper and/or paper composite material in the lower region has the disadvantage that when the packaged plant/flower receives a needed watering, these paper regions draw water and unattractively discolor, or become unstable as a result.

In order to prevent this, in one embodiment the paper and/or paper composite material of the front panel and the rear panel at the lower, short base edges, has a water repellant, preferably waterproof design. This can be achieved for example, by a coating or lamination, preferably with a height of 3 to 20 mm, that is, the coating/lamination overall covers this much of the height. Packaged plants/flowers can then be placed in a flat water tub without any problem, and without a negative effect on the packing element.

A potential coating can be constructed by the region of the lower base edges of the front panel and the rear panel being dipped into a liquid coating medium, particularly such that the coating agent contacts the front panel and/or rear panel in the base edge region preferably on the outside and the inside, and therefore seals each lower edge up to the coating height in a waterproof manner. A liquid coating agent can also be applied in any other manner around each lower edge of the short base edges.

In one particularly advantageous embodiment, according to the invention a lamination can be formed by a first adhesive film strip that extends between the side edges of the front panel, at the lower, short base edge of the front panel to the outer side thereof, and by a second adhesive film strip that extends between the side edges of the rear panel, at the lower, short base edge of the rear panel to the outer side thereof. The longitudinal extension direction of the adhesive film strip in this case preferably runs parallel to the respective base edge, and surrounds the lower edge of the front panel and/or rear panel.

To reliably prevent water from penetrating into the paper at each of the adhesive strip ends as well, the front panel and the rear panel can each have a cutout or punched-out section at both of the lower corners, and the adhesive strips adhere to each other at these corner regions. The height of the punched-out section and the height of the adhesive strip in this case are preferably matched.

BRIEF DESCRIPTION OF THE DRAWING

One embodiment of the invention is described with reference to the drawing in which.

SPECIFIC DESCRIPTION OF THE INVENTION

Figure 1:
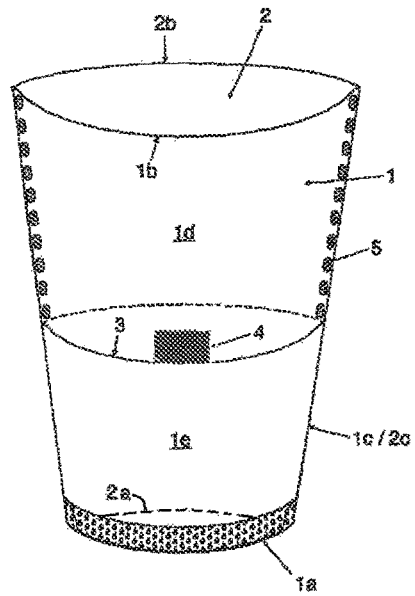
FIG. 1 is a perspective view of a packing element according to the invention with its panels spread.

FIG. 1 shows a packing element, wherein the front panel 1 and the rear panel 2 thereof each have a trapezoidal shape, with lower and upper parallel base edges 1a, 2a, 1b, 2b, as well as lateral, nonparallel side edges 1c and 2c.

The rear panel 2 and the lower region 1e of the front panel 1 in this case are made of paper. The upper region 1d of the front panel is made of transparent film and glued to the lower region. The bonding is covered by the lower paper region 1e.

The film region 1d of the front panel 1 has a tear line 3 running parallel to the base edge 1a, above which—in this case in the center of the width thereof—a strap 4 is attached to the film region.

Figure 2:
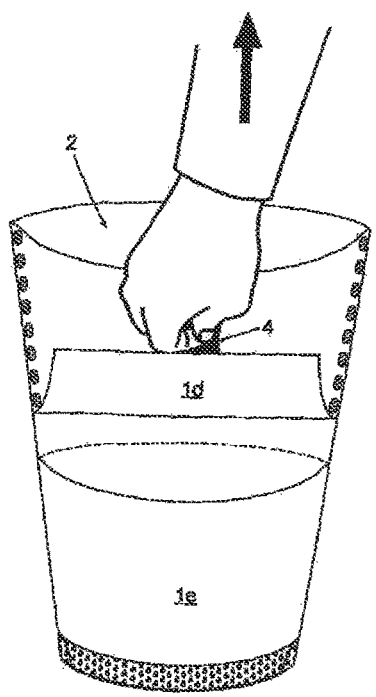
FIG. 2 is a first step showing stripping off of the upper region of the front panel.

As FIG. 2 shows, the film region 1d can be separated from the lower paper region 1e and pulled away upward by pulling on the strap 4, wherein at same time an adhesive connection 5 of points of glue on the side edges 1c/2c between the rear panel 2 and the film region 1d is separated. The film region can then preferably be removed without destroying same, and be disposed of by proper sorting. In this way, only the portion made of paper remains.

Figure 3:
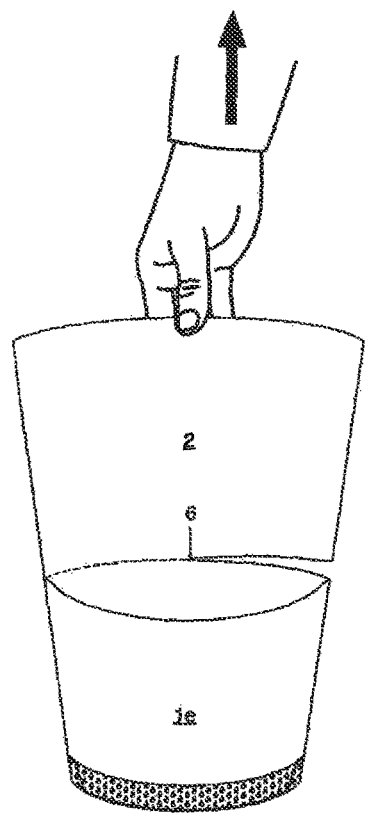
FIG. 3 shows a second step of stripping off an upper part of the rear panel.
Figure 4:
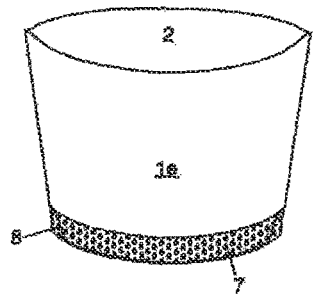
FIG. 4 shows the packing element when fully stripped.

FIG. 3 illustrates how the rear panel 2 also has a tear line 6 such that in this case as well, the upper region can be separated, whereupon only a lower region of the packing element remains, as can be seen in FIG. 4.

FIG. 4 shows the remaining region in detail. Here it can be seen that an adhesive strip 7 is wrapped around each lower edge, on the short base edge, of both the front panel 1 and/or the lower region 1e thereof, and the rear panel 2, as protection against moisture. In the corners 8, both the front panel and the rear panel have a cutout or a punched-out section 8. In this region, the adhesive strip adheres to itself. As such, water that is in contact cannot reach the paper region of the lower packing element region from below.

The invention claimed is:

1. A packing element comprising:
   a trapezoidal front panel;
   a trapezoidal rear panel, the panels each having a long upper base edge, thereto, a short lower base edge parallel thereto, and two nonparallel side edges bridging ends of the respective short and long base edges, the front panel and the rear panel being connected to each other at their side edges such that a space for receiving an article is formed between the front panel and the rear panel by moving the panels away from each other, thereby forming an opening at least between the long base edges, the front panel having a tear line generally parallel to the respective base edges and subdividing the front panel into an upper transparent part and a lower paper part;
   a coating or lamination of waterproof material at each of the short base edges and having a height of 3 to 20 mm, the coating being formed by a first adhesive film strip that extends between the side edges of the front panel on the outside at the short base edge of the front panel, and by a second adhesive film strip that extends between the side edges of the rear panel on the outside at the short base edge thereof; and
   a grab formation that can be gripped by hand on the front panel above the tear line so that the upper part of the front panel above the tear line can be separated from the lower part of the front panel below the tear line.

2. The packing element according to claim 1, wherein the side edges between the front panel and the rear panel are detachably bonded together at least above the tear line.

3. The packing element according to claim 2, wherein the upper part of the front panel can be separated from the rear panel at the side edges by the grab formation, particularly without destroying the upper part of the front panel.

4. The packing element according to that claim 1, wherein the rear panel also has a tear line running between the respective side edges generally parallel to the respective base edges.

5. The packing element according to claim 4, wherein the tear line of the rear panel runs parallel to the tear line of the front panel and at a spacing of less than 10 mm therefrom.

6. The packing element according to claim 4, wherein the tear line of the rear panel is provided level with the upper edge of the lower part of the front panel.

7. The packing element according to claim 4, wherein the tear line of the front panel and the tear line of the rear panel are provided at a spacing from the respective short base edge of the respective panel, that is less than 50% of a spacing between the respective long and short base edges.

8. The packing element according to claim 1, wherein when the packing element is opened, it can form a pouch that is closed at the bottom, or a tapered tube with both ends open.

9. The packing element according to claim 1, wherein the front panel and the rear panel each have a cutout or punched-out section at both of the lower corners, and the adhesive strips adhere to each other at these corners.

10. A packing sleeve for cut flowers or a potted plant, the sleeve comprising:
    a generally trapezoidal one-piece rear panel of paper material having a long upper base edge, a short lower base edge parallel thereto, and a pair of nonparallel side edges extending generally vertically between ends of the upper and lower base edges;
    a generally trapezoidal front panel having a long upper base edge, a short lower base edge parallel thereto, and a pair of nonparallel side edges extending generally vertically between ends of the respective upper and lower base edges, the front panel being formed by an upper transparent part extending between the respective side edges to the upper base edge and a paper lower part extending between the respective side edges to the lower base edge, the upper part being releasably attached to the rear panel at the side edges and the lower part being permanently attached to the rear panel at the side edges;
    a tear line at a lower edge of the upper part or upper edge of the lower part releasably securing at least most of the upper part to the lower part; and
    a grab tab fixed to the upper part immediately above the tear line such that an upward pull on the grab tab separates the upper and lower parts from each other at the tear line and separates the upper part from the rear panel at the side edges.

* * * * *